United States Patent [19]

Nakatsuji

[11] Patent Number: 4,974,436
[45] Date of Patent: Dec. 4, 1990

[54] CUTTING TOOL TO FACILITATE BENDING OF HOLLOW TUBING

[75] Inventor: Sanji Nakatsuji, Oiso, Japan

[73] Assignee: Sanko Industries Limited, Japan

[21] Appl. No.: 315,323

[22] Filed: Feb. 23, 1989

[51] Int. Cl.⁵ .......................................... B21D 28/14
[52] U.S. Cl. ........................................ 72/326; 83/54; 83/636; 83/689
[58] Field of Search ................ 72/326, 325; 83/54, 83/636, 689, 686, 684, 917, 692

[56] References Cited

U.S. PATENT DOCUMENTS

| | | | |
|---|---|---|---|
| 500,373 | 6/1893 | Brachhausen | 72/326 |
| 518,766 | 4/1894 | Plecker | 72/326 |
| 1,535,777 | 4/1925 | Hoxie | 72/326 |
| 2,423,601 | 7/1947 | MacArthur | 83/689 |
| 3,473,362 | 10/1969 | Black | 72/326 |
| 3,913,420 | 10/1975 | Coon | 72/326 |

FOREIGN PATENT DOCUMENTS

| | | | |
|---|---|---|---|
| 138202 | 11/1952 | Sweden | 72/326 |
| 197712 | 12/1977 | U.S.S.R. | 83/689 |

*Primary Examiner*—Danel C. Crane
*Attorney, Agent, or Firm*—Wood, Phillips, Mason, Recktenwald & VanSanten

[57] ABSTRACT

A cutting blade for use in a ram operated system for strategically cutting out tubing to facilitate bending thereof. The cutting blade has: first and second walls arranged in a V-shape, with each having a leading end and a trailing end; first and second substantially straight shearing edges on the leading ends of the first and second walls and residing substantially in a single plane; a planar entry surface angularly disposed with respect to the plane of the shearing edges; and an elongate, substantially straight, ridge at the apex of the V-shaped walls and defining, in conjunction with the planar entry surface, a leading tip on the cutting blade for penetrating a tubing piece.

25 Claims, 2 Drawing Sheets

CUTTING TOOL TO FACILITATE BENDING OF HOLLOW TUBING

BACKGROUND OF THE INVENTION

1. Field of the Invention

This invention relates to tube bending and, more particularly, to a tool for strategically cutting out a portion of the tubing to facilitate bending thereof and a method of bending tubing utilizing the novel cutting tool.

2. Background Art

There are a number of different techniques used to bend hollow tubing made from iron, steel, lead, aluminum and the like. For example, conventional brakes, such as commonly used to bend sheet metal, are also utilized to bend tubing. The tubing is forcibly urged against a curved surface on a die receptacle matched to the cross section of the tubing. U-shaped, V-shaped, circular cross sections, and the like, can be readily accommodated by correspondingly formed dies. While this is the most commonly employed method for bending tubing, it has a number of drawbacks.

It is difficult with a conventional brake to consistently and accurately bend tubing. Another drawback with the conventional brake is that the bends cannot be made with sharp, squared corners. For example, if a large diameter tube is bent at 90°, the corner is accurately formed. A further drawback with the conventional brake is that it is generally unsuitable for bending tubing having a square/rectangular cross section. When one attempts to bend square material with a brake, the tubing side walls tend to collapse and the corners bulge, thereby producing an unsightly product.

As an alternative to the use of a brake, a core die may be inserted into the tubing to cooperate with another die through which the tubing is cut, after which bending can proceed. Bending by this method is time consuming, complicated and requires the stocking of separate core dies to match individual tubing cross sections. Further, the internal cross section of tubing is generally inconsistent due to welds, burrs, and the like projecting into the tubing hollow.

As an alternative to bending tubing, it is known to cut the tubing into separate parts and join the parts at desired angles, as by welding. This technique also has several drawbacks. The pieces must be held in proper relationship, as by a jig, and thereafter welded in several spots. Inevitably, inconsistent and inaccurate assembly results. Further, welding leaves an exposed, unsightly bead at the point of connection. Overall, such a technique is time consuming, complicated and thereby expensive.

In addition to the fact that the above bending techniques are relatively complicated to perform and time consuming, the finished product produced by the above techniques may be aesthetically unpleasing. The integrity, as well as the appearance, of the finished product, may vary from one assembly to the next. These problems are particularly prevalent with square tubing.

The inventor herein previously developed a bending technique that is an alternative to the above described techniques and which has particular utility in overcoming the problems associated with bending square tubing. According to that invention, a cutting blade is directed through a square tubing piece so as to cut a V-shaped notch through the walls of one facing wall pair and a square/rectangular notch in a third wall between the walls of the one wall pair and connecting the spaced, V-shaped notches. The cutting blade scores the wall opposite the third wall to define a weakening fold line The wall opposite the third wall can thus be folded to bring the edges of the tubing parts bounding the V-shaped notches into close proximity. The parts can be spot welded to maintain the desired configuration of the tubing.

The cutting blade used to form the notches in the tubing has heretofore been made with wavy, shearing edges. While these cutting blades have been very effective in operation, they are relatively complicated, and thus expensive, to manufacture. Further, there are several sharp points on the wavy edge which are prone to chipping. A chip anywhere on the blade may render the entire blade useless. Therefore, constant inspection of the blade by the press operator is required resulting in significant down time.

SUMMARY OF THE INVENTION

The present invention is specifically directed to overcoming the above enumerated problems in a novel and simple manner.

According to the invention, a cutting blade is provided for use in a ram operated system for strategically cutting out tubing to facilitate bending thereof. The cutting blade has: first and second walls arranged in a V-shape, with each having a leading end and a trailing end; first and second substantially straight shearing edges on the leading ends of the first and second walls and residing substantially in a single plane; a planar entry surface angularly disposed with respect to the plane of the shearing edges; and an elongate, substantially straight, ridge at the apex of the V-shaped walls and defining, in conjunction with the planar entry surface, a leading tip on the cutting blade for penetrating a tubing piece.

By forcibly urging the cutting blade against a tubing piece in the line of the straight ridge, a V-shaped notch is caused to be severed from opposite walls of the tubing piece by the cutting blade. The tubing parts on the opposite sides of the notch are then bendable relative to each other about the wall at the apex of the V-shaped notches and can then be suitably secured to each other, as by welding.

By employing the inventive cutting blade, consistent and accurate tube bending results. Further, the integrity of the tubing is maintained. The wall which is common to both tubing parts remains intact during the process.

By utilizing the inventive cutting blade, cutting out and bending of tubing is simplified, resulting in increased productivity with lower production costs.

The invention contemplates the elimination of core dies and heavy duty bending equipment. With the cutout formed, it is possible for an unskilled worker to consistently fold the tubing parts relative to each other by hand. To facilitate this folding, the cutting blade is aligned to score the wall at the apex of the notches. The scored wall has a reduced thickness so that that portion acts as a hinge and prevents springback. The second wall is not appreciably weakened so that its integrity is maintained.

The finished product made utilizing the inventive cutting blade, in addition to being consistently formed, has a clean and smooth finish to provide a wider range of applications where appearance, in addition to strength, is a prerequisite. The outer corners are crisp, clean, and uninterrupted.

The invention also contemplates the provision of a thickened portion on the cutting blade side walls with edges thereon to define recesses in each of the tubing parts. The recesses accommodate a welding bead that secures the parts in their bent orientation. The weld can be neatly hidden within the recesses.

It is also an object of the invention to provide a versatile system that permits facilitated selection of cutting blades to produce a desired range of bend angles By changing the angle of the V on the first and second walls, the angle between the tube parts can be correspondingly changed. By providing interchangeable cutting blades on the ram assembly, the angles of the end products can be simply chosen.

It is another aspect of the invention to provide a simplified form of cutting blade, yet one that effectively forms a notch in metal tubing without collapsing, exploding, or otherwise detrimentally deforming the tubing.

In a preferred form of the cutting blade, the plane of the shearing edges is disposed at an angle preferably between 30°-45° with respect the line of movement of the advancing cutting blade and the planar entry surface makes an angle of preferably less than 10° with respect to a plane at a right angle with respect to the line of movement of the cutting blade.

A second planar surface, at an angle preferably between 10°-20° with respect to the plane at right angles to the line of movement of the cutting blade, is provided between the shearing edges and the planar entry surface.

As the cutting blade penetrates the tubing, the surface between the shearing edges progressively curls and bends the severed portion of the tubing away from the apex of the notch. A concave surface, on the cutting blade and opening in the direction of movement of the advancing cutting edge, urges the severed tubing section progressively outwardly away from the apex of the notches until complete separation from the tubing is effected.

An enlargement is provided on the cutting blade and has edges parallel to the shearing edges to sever spaced notches out of the tubing at the open end of the notches. The notches provide a space within which the tubing parts can be welded so that the welding bead does not protrude from the bent tube.

The invention contemplates that the cutting blade be part of a cutting tool. The cutting tool has a V-shaped body with a leading end and trailing end, with the cutting blade at the leading end thereof. The cutting blade can be formed separately from or integrally with the body.

The cutting tool is part of a system consisting of a bed which maintains a workpiece in a predetermined orientation and a ram which is guided in translation towards and away from the bed. The cutting tool is removably attached to the ram and cooperates with the bed in a fashion that the cutting tool can move unimpeded against and through a workpiece on the bed.

It is another aspect of the invention to provide a versatile system wherein cutting blades and/or cutting tools can be readily interchanged. The bodies of the cutting tools have mounting walls for attachment to the ram assembly. Selected mounting tools can be removably bolted to the ram assembly.

DETAILED DESCRIPTION OF THE DRAWINGS

Figure 3:
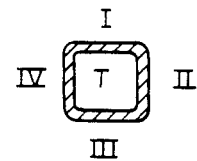
FIG. 3. is a cross-sectional view of an exemplary piece of square tubing with which the present invention can be used.
Figure 9:
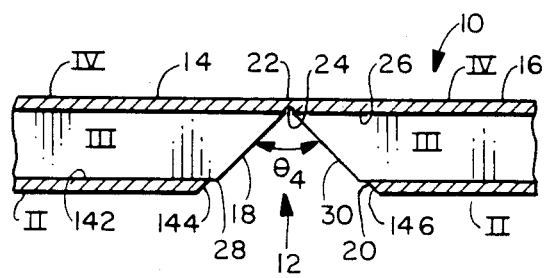
FIG. 9 is a section view of a piece of square tubing, as shown in FIG. 3, with a cutout therein made with the inventive cutting blade.
Figure 10:
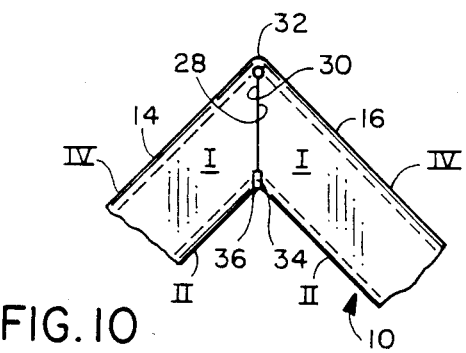
FIG. 10 is a plan view of the tubing in FIG. 9 with the tube bent at 90°.

The inventive device is particularly adapted to facilitate bending of square tubing made from steel, aluminum, lead, iron, and the like. Reference is made initially to FIGS. 3, 9 and 10, which show a representative piece of hollow metal tubing 10, with a square configuration. It should be understood that while the inventive structure is described herein for bending square tubing, it is usable for bending tubing with other cross-sectional configurations. Further, it is not necessary that the tubing be hollow.

The tubing at 10 in FIGS. 3, 9 and 10 consists of first and second facing wall pairs I, III and II, IV, respectively. The objective of the invention is to facilitate bending of tubing such as that shown at 10.

In FIG. 9, the tubing is shown with a cutout at 12 to permit bending of one tube part 14 on one side of the cutout 12 relative to the tube part 16 on the other side of the cutout 12. The invention contemplates the provision of a V-shaped notch 18 in each of walls I and III and a squared notch 20 in the wall II connecting between the notches 18. With the cutout 12 formed, the tube parts 14, 16 are interconnected only by the wall IV and are foldable relative to each other about the portion 22 of wall IV at the apex 24 cf the notches 18. The inside surface 26 of wall IV is scored at the apex 24 of the notches 18 so that the portion 22 has a reduced thickness and acts as a hinge for the two tube parts 14, 16 to be folded relative to each other without springback. The weakening at the apex 24 makes it possible for an individual, by hand, to readily bend the tube parts 14, 16 relative to each other from the FIG. 9 position to that in FIG. 10. The scoring is sufficiently shallow on the inside surface 26 that the wall IV is not appreciably weakened when folded into the FIG. 10 configuration.

In the FIG. 10 orientation, the edges 28, 30 on tubing parts 14, 16, respectively, bounding the notches 18, abut so that the tube parts 14, 16 are at right angles with respect to each other. A clean, continuous corner 32 results at the hinge portion 22.

The notch 20 in the wall II is slightly offset from the line of the edges 28, 30 so that with the tubing in the FIG. 10 orientation, a gap 34 is defined Within the gap 34, the tubing parts 14, 16 can be fused, as by welding. The welding bead 36 is thus neatly concealed within the gap 34.

As can be seen, the resulting product is very neat in appearance and only a spot weld is required to fixedly maintain the FIG. 10 configuration. In spite of the simplicity of the bending process, a high integrity product results. Although separate machinery can be employed to bend the tubing 10 from the FIG. 9 to the FIG. 10 configurations, the transition can be consistently and simply accomplished by an unskilled individual, by hand.

To form the cutout 12 in the tubing 10, a cutting tool is employed. A prior art cutting tool is shown at 40 in FIGS. 1 and 2. The cutting tool 40 has a body 42 with oppositely facing sides 44, 46 arranged in a V-shape. A mounting block 48, remote from the apex 50 of the V, is provided on the body 42 to mount the cutting tool 40 on a suitable press, which will be described hereafter The leading end 52 of the cutting tool 40 has shearing edges 54, 56 arranged in a V-shape opening in the same direction as the V of the body 42.

The cutting tool 40 is arranged so that an elongate ridge 58, at the apex of the body 42, is aligned with the direction of movement of the cutting tool 40 during a cutting operation. As the cutting tool 40 is directed against the tubing 10, a tip 60 on the cutting tool 40 first penetrates the tubing wall I. As advancement of the tool 40 continues, a planar surface 62, oriented at an angle of approximately 80° with the line of the ridge 58, is progressively forced through the tubing 10. Further movement of the cutting tool 40 causes the shearing edges 54, 56 to be wedged progressively into the tubing wall I. This wedging action causes the shearing edges 54, 56 to smoothly sever the tubing wall I. The V-shaped notch 18 is progressively formed as the cutting tool 40 advances and concave surfaces 64, 66, 68 progressively curl the severed material away from the wall IV. The shearing edges 54, 56 have a wavy construction conforming generally to the contour of the surfaces 64 and 66. Upon the cutting tool 40 being fully advanced, the cutout 12 is formed as shown in FIG. 9.

Figure 1:
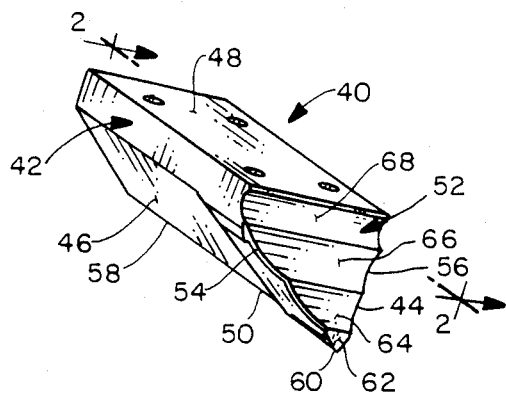
FIG. 1 is a perspective view of a prior art cutting tool for notching tubing to facilitate bending thereof.
Figure 2:
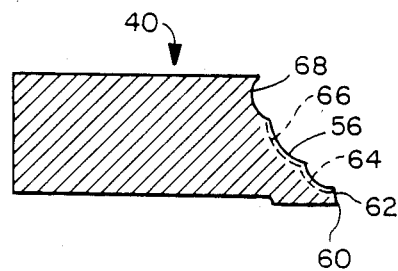
FIG. 2 is a cross-sectional view of the cutting tool taken along line 2—2 of FIG. 1

The present invention provides an alternative to the cutting tool 40 shown in FIGS. 1 and 2. The cutting tool according to the present invention is shown at 70 in FIGS. 4–9. The cutting tool 70 has a V-shaped body 72 with a leading end 74 and a trailing end 76. The leading end 74 has a cutting blade at 78 configured to define the cutout 12 in a square tubing piece 10.

The cutting blade 78 has shearing edges 80, 82 arranged in a V-shape. The apex 84 of the V on the cutting blade 78 defines a straight, elongate ridge 86 set off slightly outwardly from an elongate, straight ridge 88 at the apex of the V on the body 72. The leading end of the cutting blade ridge 86 has a planar surface 90 making an angle $\Theta 1$ with the line of the ridges 86, 88. A second planar surface 92 extends from the surface 90 and makes an angle $\Theta 2$ with the line of the ridges 86, 88. $\Theta 1$ is approximately 80° or greater and $\Theta 2$ is approximately 70°–80°.

The shearing edges 80, 82 are substantially linear and reside within a single plane that makes an angle $\Theta 3$ with the line of the ridges 86, 88. Preferably, $\Theta 3$ is preferably approximately 30°–45°. Between the shearing edges 80, 82 is a substantially flat surface 94, generally aligned with the plane of the shearing edges 80, 82 and slightly offset from the edges 80, 82 in a trailing direction. The surface 94 blends into a concave surface 96 opening in a leading direction with respect to the tool 70. The surface 96 can be traced by an arc of a circle centered on point C (FIG. 7) and terminates at the edge 98 of a flat wall 100 which is used to secure the cutting tool 70 to a press, as shown at 102 in FIG. 4 and described in detail hereafter An enlargement 104 is provided on each wall 106, 108 on the cutting blade 78. The enlargements 104 define shoulders 110 at the ends 112, 114 of the shearing edges 80, 82 respectively, remote from the cutting blade ridge 86. The enlargements 104 have cutting edges 115 parallel to and offset slightly from the line of the shearing edges 80, 82 to define the notches 20 in the wall II, as hereafter described.

Figure 4:
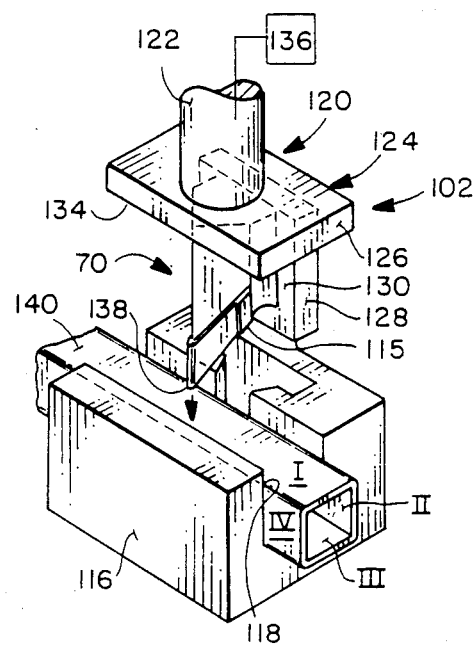
FIG. 4 is a perspective view of a system according to the present invention for notching tubing to facilitate bending thereof.
Figure 5:
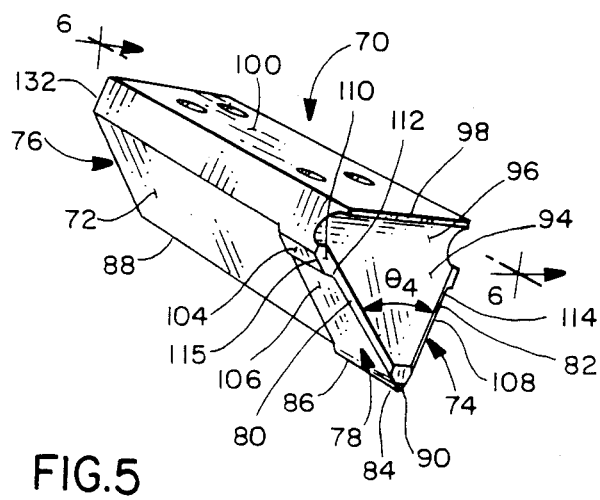
FIG. 5 is a perspective view of a cutting tool according to the present invention for use in the system of FIG. 4.
Figure 6:
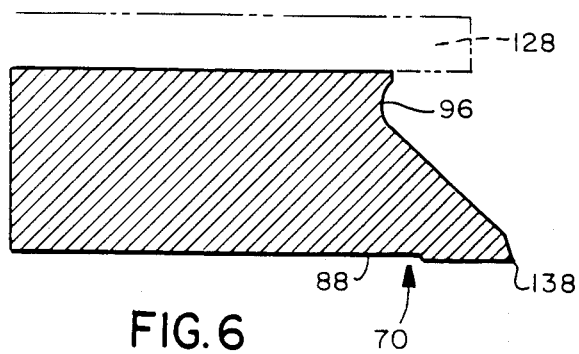
FIG. 6 is a cross-sectional view of the cutting tool taken along line 6—6 of FIG. 5.
Figure 8:
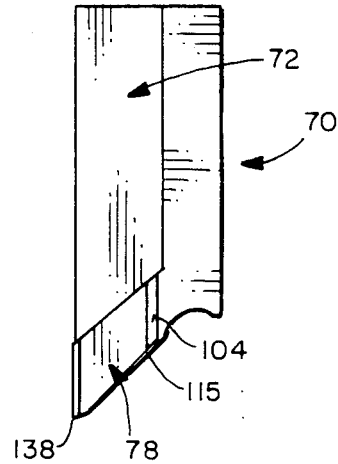
FIG. 8 is a side elevation view of the inventive cutting tool.
Figure 7:
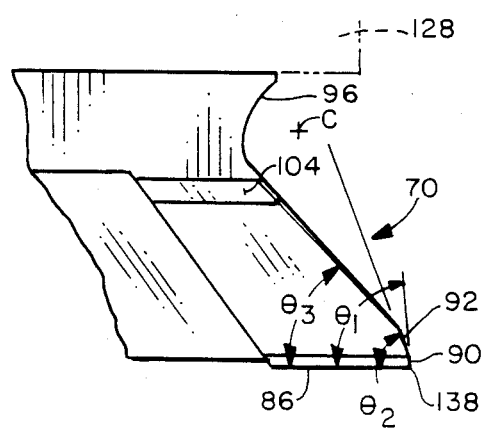
FIG. 7 is an enlarged, fragmentary, elevation view of a cutting blade on the cutting tool of FIGS. 5 and 6.

To operate the cutting tool, a press 102, as shown in FIG. 4, is provided. The press 102 consists of a bed 116 with a squared seat 118 for receiving and maintaining the square tubing 10 in a predetermined orientation. A ram assembly 120 carries the cutting tool 70 and is movable in a reciprocating, vertical, translatory path. The ram assembly 120 has a drive rod 122 with an associated frame at 124 consisting of a horizontal plate 126 and a vertical plate 128 fixed at right angles to each other.

The cutting tool 70 is arranged so that the wall 100 therein fits facially against a flat surface 130 on the plate 128 and an upper flat surface 132 on the cutting tool body 72 bears facially against the downwardly facing surface 134 on the horizontal plate 126. The cutting tool 70 is secured releasably to the plates 126, 128 in conventional manner as by screws or bolts so that assembly and disassembly is facilitated.

The ram assembly 120 is forced downwardly by any suitable drive mechanism, shown schematically at 136 in FIG. 4. As the ram assembly 120 moves downwardly from the FIG. 4 position, the corner 138 at the juncture of the planar surface 90 and ridge 86 encounters the upper surface 140 of the wall I and is in vertical coincidence with the inside edge of the wall IV. As the ram assembly 20 moves downwardly, the planar surface 92 moves through the wall I and scores the inside surface 26 of wall IV. The surfaces 90, 92, by reason of their angular orientation, tend to fold a flap which they define in the wall I away from the tubing wall IV. As downward movement of the ram assembly 120 continues, the shearing edges 80, 82 sever the wall I and the surface 94 between the edges 80, 82 progressively curls the flap cut from the wall I.

The length of the shearing edges 80, 82 is chosen so that they terminate at the inside surface 142 of the wall II. The wall II is sheared by the edges 115 of shoulders 110 on the enlargements 104. The edges 115 are parallel to and offset from the line of the edges 80, 82 so that, as seen in FIG. 9, the surfaces 144, 146 defined by the shoulders 110 are spaced slightly outwardly from the line of the notch edges 28, 30.

With the ram assembly 120 fully extended downwardly, the material severed by the cutting tool 70 completely separates from the remainder of the tubing 10. The tubing parts 14, 16 are then readily foldable about the score line in wall IV without springback.

The particular angle of bending is determined by the angle $\Theta 4$ between the shearing edges 80, 82, which produces the same angle between the cut edges 28, 30 on the tubing 10. By simply varying the angle $\Theta 4$ between the shearing edges 80, 82, any desired angle can be selected. Each cutting tool 76 has a fixed, predetermined angle Θ4 between the shearing edges 80, 82. By interchanging the cutting tools 76, the desired angle can be readily selected. Preferably, the angle Θ4 is slightly larger than the desired angle for the tubing 10. Some burrs inevitably develop on the edges 28, 30 as the cutout 12 is formed, which burrs are accommodated by the slightly larger angle.

The foregoing disclosure of specific embodiments is intended to be illustrative of the broad concepts comprehended by the invention.

I claim:

1. A tool for cutting tubing to facilitate bending thereof, said tool comprising:
   a V-shaped body having a leading end, a trailing end, and a substantially straight, elongate ridge at the apex of the V; and
   a cutting blade at the leading end of the body, said cutting blade including:
   (a) a planar entry surface making a first angle with respect to the line of the body ridge;
   (b) first and second substantially straight shearing edges diverging away from each other and each making a second angle with respect to the line of the body ridge, said second angle being less than the first angle,
   said first and second shearing edges cooperatively defining a V-shape and said elongate ridge residing at least partially outside of the V defined by the first and second shearing edges; and
   (c) means at the leading end of the body for deforming part of a tubing piece that is servered by said cutting tool as the tool is forcibly advanced against a tubing piece substantially in the line of the elongate ridge,
   whereby the cutting tool advanced substantially in the line of the elongate ridge against a tubing piece causes a V-shaped cutout to be progressively formed in the tubing piece and the elongate ridge residing at least partially outside of the V defined by the first and second shearing edges defines a notch offset from the V.

2. The cutting tool according to claim 1 wherein said first angle is approximately 80°–90°.

3. The cutting tool according to claim 1 wherein said second angle is approximately 30°–45°.

4. The cutting tool according to claim 1 including means on the body for connecting the body to a movable ram for forcibly advancing the cutting tool against a workpiece.

5. The cutting tool according to claim 1 wherein there is a second planar surface between the planar entry surface and the shearing edges and said second planar surface makes a third angle being less than the first angle.

6. The cutting tool according to claim 1 in combination with a bed having means for maintaining a workpiece in a predetermined orientation, a ram, means for translating the ram towards and away from a workpiece on the bed and means for attaching the cutting tool to the ram so that the cutting blade at the leading end of the body can be forcibly directed against and through a tubing piece on the bed.

7. A tool for cutting tubing to facilitate bending thereof, said tool comprising:
   a V-shaped body having a leading end, a trailing end, and a substantially straight, elongate ridge at the apex of the V; and
   a cutting blade at the leading end of the body, said cutting blade including:
   (a) a planar entry surface making a first angle with respect to the line of the body ridge;
   (b) first and second substantially straight shearing edges diverging away from each other and each making a second angle with respect to the line of the body ridge, said second angle being less than the first angle; and
   (c) means at the leading end of the body for deforming part of a tubing piece that is servered by said cutting tool as the tool is forcibly advanced against a tubing piece substantially in the line of the longate ridge,
   wherein said means for deforming part of a severed tubing piece comprises a wall between said shearing edges and offset from the shearing edges in a trailing direction,
   whereby the cutting tool advanced substantially in the line of the elongate ridge against a tubing piece causes a V-shaped cutout to be progressively formed in the tubing piece.

8. The cutting tool according to claim 7 wherein said wall has a concave surface opening in a leading direction with respect to the body.

9. A tool for cutting tubing to facilitate bending thereof, said tool comprising:
   a V-shaped body having a leading end, a trailing end, and a substantial straight, elongate ridge at the apex of the V; and
   a cutting blade at the leading end of the body, said cutting blade including:
   (a) a planar entry surface making a first angle with respect to the line of the body ridge;
   (b) first and second substantially straight shearing edges diverging away from each other and each making a second angle with respect to the line of the body ridge, said second angle being less than the first angle; and
   (c) means at the leading end of the body for deforming part of the tubing piece that is severed by said cutting tool as the tool is forcibly advanced against a tubing piece substantially in the line of the elongate ridge,
   wherein means are provided on the cutting blade for defining a notch in a tubing piece which notch is offset from the line of one of the straight shearing edges,
   whereby the cutting tool advanced substantially in the line of the longate ridge against a tubing piece causes a V-shaped cutout to be progressively formed in the tubing piece.

10. The cutting tool according to claim 9 wherein the cutting blade has an enlargement thereon and the notch defining means comprises a shoulder on said enlargement with a straight edge parallel to said one straight shearing edge.

11. The cutting tool according to claim 9 wherein said shoulder resides between the planar entry surface and the deforming means.

12. A tool for cutting tubing to facilitate bending thereof, said tool comprising:
    a V-shaped body having a leading end, a trailing end, and a substantially straight, elongate ridge at the apex of the V; and
    a cutting blade at the leading end of the body, said cutting blade including:

(a) a planar entry surface making a first angle with respect to the line of the body ridge;

(b) first and second substantially straight shearing edges diverging away from each other and each making a second angle with respect to the line of the body ridge, said second angle being less than the first angle; and (c) means at the leading end of the body for deforming part of a tubing piece that is severed by said cutting tool as the tool is forcibly advanced against a tubing piece substantially in the line of the elongate ridge, wherein said cutting blade has a V-shaped outer surface, the body has a V-shaped outer surface and the apex of the V on the outer surface of the cutting blade is offset from the apex of the V on the outer surface of the body so that the apex of the V on the cutting blade surface projects outwardly from the body ridge and defines a second ridge, said planar entry surface being defined on said second ridge, whereby the cutting tool advanced substantially in the line of the elongate ridge against a tubing piece causes a V-shaped cutout to be progressively formed in the tubing piece.

13. A cutting blade for use in a ram operated die system for cutting tubing to facilitate bending thereof, said cutting blade comprising:

first and second walls arranged in a V-shaped and each having a leading end and a trailing end;

first and second substantially straight shearing edges on the first and second walls and residing substantially in a single plane;

a planar entry surface angularly disposed with respect to the plane of the shearing edges;

an enlargement on a at least one of said first and second walls outside of the V defined by said first and second walls; and an elongate substantially straight ridge at the apex of the V-shaped walls and defining in conjunction with the planar entry surface a leading tip on the cutting blade for penetrating a tubing piece, whereby the cutting blade advanced substantially in the line of the elongate ridge against a tubing piece causes a V-shaped cutout to be progressively formed in the tubing piece and the enlargement defines a notch offset form the V.

14. The cutting blade according to claim 13 wherein there is a second planar surface between the planar entry surface and shearing edges and the second planar surface is angularly disposed with respect to the plane of the shearing edges.

15. The cutting blade according to claim 13 wherein the planar entry surface makes an angle of approximately 35°–60° with the plane of the shearing edges 16. The cutting blade according to claim 13 wherein the second planar surface makes an angle of approximately 35°–50° with the plane of the shearing edges.

17. The cutting blade according to claim 13 wherein means are provided on the cutting blade for progressively bending part of a tubing piece that is severed by the shearing edges as the cutting blade is advanced against a tubing piece in the line of the straight ridge 18. The cutting blade according to claim 13 in combination with means for forcibly advancing the cutting blade in the line of the straight edge at the apex of the walls through a tubing piece to define a V-shaped notch in a tubing piece.

19. A cutting blade for use in a ram operated die system for cutting tubing to facilitate bending thereof, said cutting blade comprising:

first and second walls arranged in a V-shaped and each having a leading end and a trailing end;

first and second substantially straight shearing edges on the first and second walls and residing substantially in a single plane;

a planar entry surface angularly disposed with respect to the plane of the shearing edges; and an elongate substantially straight ridge at the apex of the V-shaped walls and defining in conjunction with the planar entry surface a leading tip on the cutting blade for penetrating a tubing piece, wherein means are provided on the cutting blade for progressively bending part of a tubing piece that is severed by the shearing edges as the cutting blade is advanced against a tubing piece in the line of the straight ridge, wherein the bending means include a concave surface opening in a leading direction with respect to the cutting blade, whereby the cutting blade advanced substantially in the line of the elongate ridge against a tubing piece cause a a V-shaped cutout to be progressively formed in the tubing piece.

20. A cutting blade for use in a rame operated die system for cutting tubing to facilitate bending thereof, said cutting blade comprising:

first and second walls arranged in a V-shaped and each having a leading end and a trailing end;

first and second substantially straight shearing edges on the first and second walls and residing substantially in a single plane;

a planar entry surface angularly disposed with respect to the plane of the hearing edges; and an elongate substantially straight ridge at the apex of the V-shaped walla and defining in conjunction with the planar entry surface a leading tip on the cutting blade for penetrating a tubing piece, wherein means are provided on the cutting blade for defining a notch in a tubing piece which notch is offset from the line of one of the straight shearing edges, whereby the cutting blade advanced substantially in the line of the elongate ridge against a tubing piece cause a a V-shaped cutout to be progressively formed in the tubing piece.

21. A tool for cutting tubing to facilitate bending thereof, said tool comprising:

a V-shaped body having a leading end, a trailing end, and a substantially straight, elongate ridge at the apex of the V; and a cutting blade at the leading end of the body, said cutting blade including:

(a) first and second substantially straight shearing edges diverging away from each other and each making an angle with respect to the line of the body ridge so that the shearing edges cooperatively define a V;

(b) means at the leading end f the body for deforming part of a tubing piece that is severed by said shearing edges as the tool is forcibly advanced against a tubing piece substantially in the line of the elongate ridge; and (c) an enlargement in the cutting blade residing outside of the V defined by the shearing edges, whereby the cutting blade advances substantially in the line of the elongate ridge against a tubing piece cause a V-shaped cutout to be progressively formed in the tubing piece and the enlargement defines a notch offset from the V.

22. The cutting blade according to claim 21 wherein said acute angle is between 30°–45°.

23. The cutting blade according to claim 22 wherein said cutting blade has a planar cutting portion spaced in a leading direction with respect to the shearing edges, disposed at an angle to at least one of the straight shearing edges, and disposed at an angel of 80°–90° with respect to the line of the elongate ridge.

24. The cutting blade according to claim 21 wherein the enlargement is at the apex of the V and defines said ridge.

25. The cutting blade according to claim 21 wherein there is an enlargement connected to each of the shearing edges and spaced from each other.

* * * * *